(12) United States Patent
Tang et al.

(10) Patent No.: US 10,275,734 B2
(45) Date of Patent: Apr. 30, 2019

(54) INTEGRATED SECURITY INSPECTION SYSTEM

(71) Applicant: Nuctech Company Limited, Beijing (CN)

(72) Inventors: Bo Tang, Beijing (CN); Zhongrong Yang, Beijing (CN); Zhiqiang Chen, Beijing (CN); Yuanjing Li, Beijing (CN); Qinchan Wang, Beijing (CN); Long Tian, Beijing (CN); Yanxiang Xu, Beijing (CN)

(73) Assignee: Nuctech Company Limited, Beijing (CN)

( * ) Notice: Subject to any disclaimer, the term of this patent is extended or adjusted under 35 U.S.C. 154(b) by 656 days.

(21) Appl. No.: 14/983,370

(22) Filed: Dec. 29, 2015

(65) Prior Publication Data

US 2016/0189096 A1    Jun. 30, 2016

(30) Foreign Application Priority Data

Dec. 29, 2014  (CN) .......................... 2014 1 0837014

(51) Int. Cl.
*G06Q 10/08* (2012.01)
*G01V 5/00* (2006.01)

(52) U.S. Cl.
CPC ....... *G06Q 10/0832* (2013.01); *G01V 5/0033* (2013.01)

(58) Field of Classification Search
CPC ............. G06Q 10/0832; G06Q 50/265; G01V 5/0008; G01V 5/0041; G01V 5/005; G06K 2209/09; G06T 2207/30232
See application file for complete search history.

(56) References Cited

U.S. PATENT DOCUMENTS 3,695,462 A  * 10/1972  Sullivan .................. B64F 1/366
                                                        214/16 B
5,793,639 A    8/1998  Yamazaki ................ 364/478.14
(Continued)

FOREIGN PATENT DOCUMENTS

CN        102348601 A      2/2012
CN        103460232 A     12/2013
(Continued)

OTHER PUBLICATIONS

Search Report and 1st Office Action dated Sep. 5, 2016, received in Chinese Application No. 201410837014.9 (7 pgs), as well as concise English-language summary/translation of same (1 pg); 8 pages total.

(Continued)

*Primary Examiner* — Andrew W Johns
(74) *Attorney, Agent, or Firm* — Knobbe Martens Olson & Bear LLP

(57) ABSTRACT

The invention discloses an integrated security inspection system, comprising: a server, an information input unit in an information input area, a tray distributing and associating unit and a security inspection imaging and sorting unit in a baggage check area. The tray distributing and associating unit distributes a tray with an identifier to a piece of baggage. The information input unit obtains and sends information of a person to the server. The tray distributing and associating unit obtains and sends information of the person and the identifier of the tray to the server, which processes them to generate a first association information. The security inspection imaging and sorting unit checks the baggage to obtain a security image, read the identifier, and send them to the server, which processes them to generate a second association information. The server matches and stores the information of the person with information of the security image.

20 Claims, 2 Drawing Sheets

(56) References Cited

U.S. PATENT DOCUMENTS

| | | | |
|---|---|---|---|
| 6,044,353 A | 3/2000 | Pugliese, III | 705/5 |
| 2007/0010006 A1 | 1/2007 | Quine et al. | 435/287.1 |
| 2007/0280502 A1 | 12/2007 | Paresi et al. | 382/100 |
| 2012/0114103 A1 | 5/2012 | Aust et al. | 378/98.2 |
| 2012/0189097 A1 | 7/2012 | Bloesl et al. | 378/57 |
| 2012/0228377 A1 | 9/2012 | Carpenter et al. | 235/382 |
| 2014/0156561 A1 | 6/2014 | Steele et al. | B65D 1/36 |

FOREIGN PATENT DOCUMENTS

| | | |
|---|---|---|
| CN | 204287075 U | 4/2015 |
| JP | 2002/257751 A | 9/2002 |
| JP | 2006/513919 A | 4/2006 |
| JP | 2014/510917 A | 5/2014 |
| RU | 2046324 C1 | 10/1995 |
| RU | 125365 U1 | 2/2013 |
| WO | WO 02/082290 A1 | 10/2002 |
| WO | WO 2004/006202 A2 | 1/2004 |
| WO | WO 2006/074431 A2 | 7/2006 |

OTHER PUBLICATIONS

Office Action dated Nov. 1, 2016, received in Japanese Application No. 2015-253497 (4 pgs), as well as English-language translation of same (5 pgs); 9 pages total.
Office Action dated Dec. 7, 2016, received in Russian Application No. 2015154788 (2 pgs), as well as English-language translation of same (2 pgs); 4 pages total.
European Extended Search Report regarding Application No. EP 15199799.6, dated May 19, 2016, 8 pages.

\* cited by examiner

INTEGRATED SECURITY INSPECTION SYSTEM

CROSS-REFERENCE TO RELATED APPLICATIONS

This application claims priority to Chinese Patent Application No. 201410837014.9, filed on Dec. 29, 2014, published as CN104502368 B, and entitled "Integrated Security Inspection System", which is hereby incorporated by reference in its entirety.

BACKGROUND

Field

The inventions herein relate to the field of security checking or check-points, and more specifically to an integrated security inspection system.

Description of Related Information

Existing security inspection systems are generally used in public places, such as border checkpoint, airports, railway stations, bus stations and so on. At these crowded places, criminals often commit offences with prohibited articles, such as knives and guns, which causes serious casualties and great property loss and adversely affects the public well-being. Security check systems play an important role in these places to prevent harm to the public.

Current security inspection channels for passengers are merely simple integration of various security inspection devices, and the security inspection is performed depending on the coordination of security inspectors. Therefore, there are defects of high labor cost, low overall security inspection efficiency, disordered management of passengers and their baggage, etc. In order to solve the above problems, there is a need for an integrated security inspection device which is highly integrated and is capable to reduce labor cost.

OVERVIEW

It is an advantage of implementations of the present innovations to provide highly integrated security inspection management systems for security administration to reduce labor cost.

To achieve such advantages, aspects of the innovations herein may provide an integrated security inspection system, characterized in that a system may include:

a server, an information input unit in an information input area, a tray distributing and associating unit and a security inspection imaging and sorting unit in a baggage check area; wherein the tray distributing and associating unit is provided in front of the security inspection imaging and sorting unit, and is adapted to distribute a security inspection tray with an identifier to a piece of baggage to be inspected;

the information input unit, the tray distributing and associating unit and the security inspection imaging and sorting unit are connected with the server, respectively; the information input unit is adapted to obtain information of a person to be inspected and send the information to the server; the tray distributing and associating unit is adapted to obtain information of the person to be inspected and the identifier of the security inspection tray and sending them to the server, which is adapted to process the information of the person to be inspected and the identifier of the security inspection tray to generate a first association information;

the security inspection imaging and sorting unit is adapted to check the baggage to be inspected to obtain a security image, read the identifier of the security inspection tray in which the baggage to be inspected is loaded, and send the security image and the identifier of the security inspection tray in which the baggage to be inspected is loaded to the server, which is adapted to process the security image and the identifier to generate a second association information; and the server is adapted to match and store the information of the person to be inspected with information of the security image according to the first association information and the second association information.

In one implementation, the security inspection imaging and sorting unit may preferably comprise an X-ray security inspection device and/or a trace explosive detector.

In one implementation, the X-ray security inspection device may preferably be any one of a dual-view security inspection machine, a single-view security inspection machine and a CT security inspection machine.

In one implementation, the security inspection imaging and sorting unit may also preferably comprise a baggage sorting device, with the baggage sorting device being provided at the exit of a security inspection channel of the X-ray security inspection device;

when the X-ray security inspection device detects a piece of suspect baggage, a suspect baggage delivery device will be actuated to deliver the suspect baggage to a suspect baggage conveying device; and when the X-ray security inspection device detects a piece of normal checked baggage, the suspect baggage delivery device will not be actuated and the normal baggage will be delivered to a normal baggage conveying device.

In one implementation, the integrated security inspection system may preferably further comprise a re-check unit in the baggage check area; and the re-check unit is provided after the security inspection imaging and sorting unit and is adapted to re-check the inspected baggage containing suspect objects after the inspected baggage is sorted by the security inspection imaging and sorting unit.

In one implementation, the integrated security inspection system may preferably further comprises a human-body machine-check unit and a human-body manual-check unit in a body check area; the human-body machine-check unit is provided in front of the human-body manual-check unit; and after being detected as suspicious by the human-body machine-check unit, the inspected person is checked at the human-body manual-check unit.

In one implementation, the human-body machine-check unit may preferably be a human-body security inspection device and/or a portal-type metal detection device, and the human-body manual-check unit is a hand-held metal detection device.

In one implementation, automatic security portals may preferably be provided in front of the human-body machine-check unit, and are adapted to restrict the number of persons to be inspected that enter the body check area.

In one implementation, the integrated security inspection system may preferably further comprise an empty tray identification and collection system in the baggage check area, wherein the empty tray identification and collection system and the security inspection imaging and sorting unit are connected by an automatic conveying system and transfer the inspected baggage and the security inspection trays through the automatic conveying system; and the empty tray identification and collection system identifies the security inspection trays, and then collects and conveys the empty security inspection trays to the tray distributing and associating unit for reuse.

Implementations of the integrated security inspection system according to the present innovations provide a highly automated security check, thereby reducing labor cost and improving efficiency for security check. The security check for the persons to be inspected and the security check for their baggage are separately performed, such that the overall security inspection channel can keep organized. The information of the person to be inspected is bound with the information of the baggage to be inspected such that the integrity of the security inspection information and the traceability of the information of the people to be inspected and the security image information can be improved.

DETAILED DESCRIPTION

Exemplary embodiments will be described in detail with reference to the drawings. However, the present disclosure should not be taken to limit the invention to the specific embodiments shown, but are for explanation and understanding only.

Figure 1:
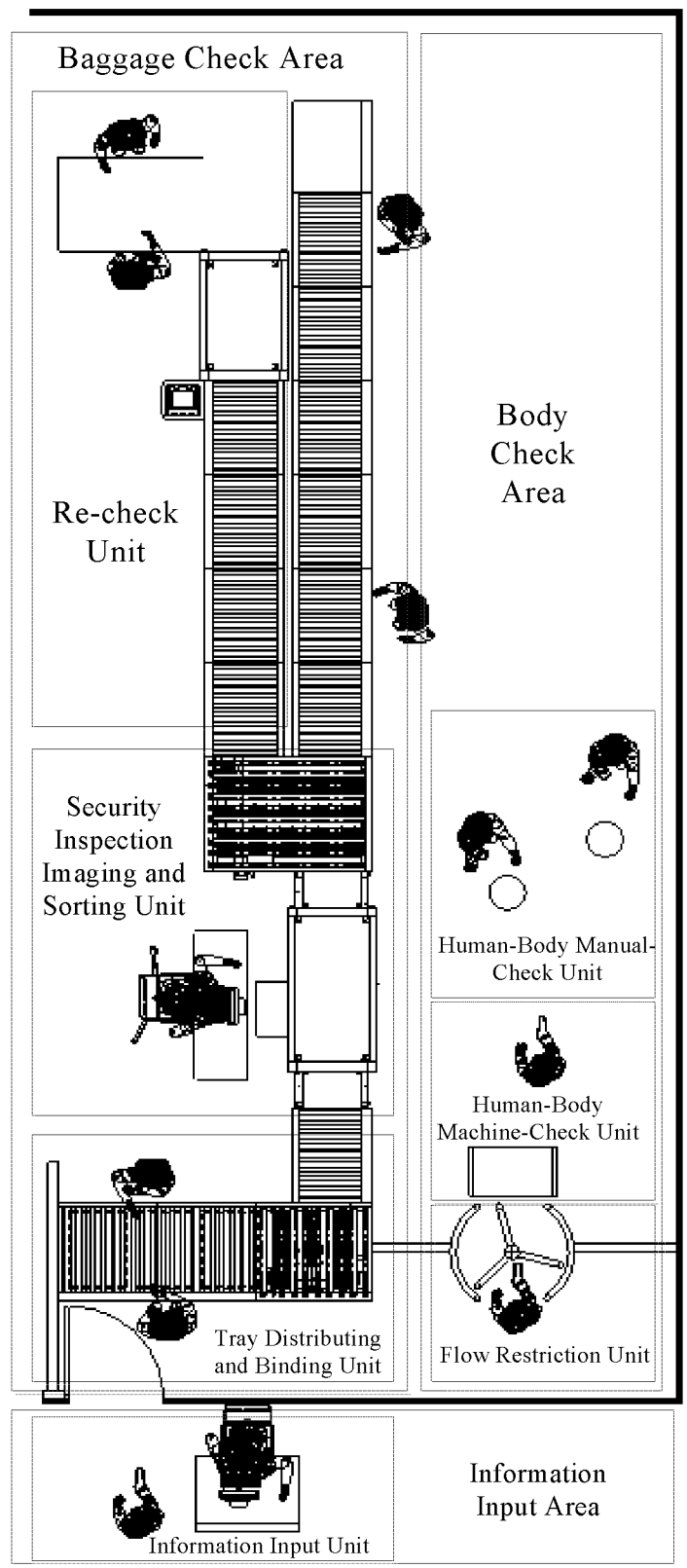
FIG. 1 is an arrangement schematic view of an integrated security inspection system according to the present invention.
Figure 2:
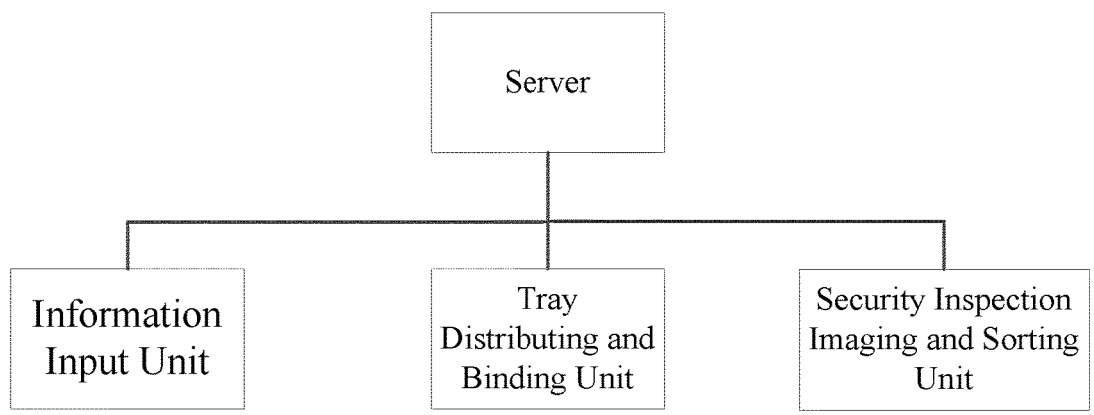
FIG. 2 is a structural schematic view of an integrated security inspection system according to the present invention.

The present invention provides an integrated security inspection system. As shown in FIG. 1, the integrated security inspection system comprises: a server (not shown), an information input unit in an information input area, a tray distributing and associating unit and a security inspection imaging and sorting unit in a baggage check area. The tray distributing and associating unit is provided in front of the security inspection imaging and sorting unit, and is adapted to distribute a security inspection tray with an identifier to a piece of baggage to be inspected. As shown in FIG. 2, the information input unit, the tray distributing and associating unit and the security inspection imaging and sorting unit are connected with the server, respectively. The information input unit is adapted to obtain information of a person to be inspected and send the information to the server. The tray distributing and associating unit is adapted to obtain information of the person to be inspected and the identifier of the security inspection tray and send them to the server, which can associate the information of the person to be inspected and the identifier of the security inspection tray to generate a first association information. The security inspection imaging and sorting unit is adapted to check the baggage to be inspected to obtain a security image, read the identifier of the security inspection tray in which the baggage to be inspected is loaded, and send the security image and the identifier of the security inspection tray in which the inspected baggage is loaded to the server, which can associate the security image and the identifier to generate a second association information. The server is adapted to match and store the information of the inspected person with information of the security image according to the first association information and the second association information. The integrated security inspection system of the present invention will be described in more detail below.

As is shown in FIG. 1, the information input unit in the information input area is adapted to obtain information of the person to be inspected. For example, when used at airports, the integrated security inspection system can obtain information of a person to be inspected, for example flight information and personal identity, by scanning his/her boarding pass. When used in other places (such as customs, bus stations and the like), the integrated security inspection system can obtain identity information of a person to be inspected by scanning his/her identity document or by accessing public security networks. The information of the person to be inspected can also be obtained by manual input. The information input unit is adapted to send the obtained information of the person to be inspected to the server.

As shown in FIG. 1 and FIG. 2, in an integrated security inspection channel according to the present invention, the tray distributing and associating unit in the baggage check area is provided in front of the security inspection imaging and sorting unit. The tray distributing and associating unit and the security inspection imaging and sorting unit are connected through an automatic conveying system, which transfers the baggage to be inspected and the security inspection tray. When the person to be inspected carries the baggage to be inspected to pass through the integrated security inspection system, the person to be inspected and the baggage to be inspected are checked separately. The baggage to be inspected should be loaded in a designated security inspection tray and subject to the security inspection in order. The tray distributing and associating unit should distribute to the current baggage to be inspected a security inspection tray for holding the baggage to be inspected. The distributed security inspection tray is provided with an identifier (which may be RFID, a bar code, or other identification information). The tray distributing and associating unit obtains information of the person to be inspected and the identifier of the security inspection tray and sends them to the server, which processes the information of the person to be inspected and the identifier of the security inspection tray to generate a first association information. The unit can obtain the information of the person to be inspected by scanning (such as scanning boarding pass, identification document and so on), through direct inputting, or from the server. At the tray distributing and associating unit, a security inspection tray is manually or automatically distributed to the current baggage to be inspected. For an automatic distribution, a certain automatic control system may be employed for automatically distributing the security inspection tray to the baggage to be inspected according to a user's (a security inspector or a person to be inspected) instructions. The tray distributing and associating unit sends the obtained information of the person to be inspected and the identifier of the security inspection tray to the server, which processes the obtained information of the person to be inspected and the identifier of the security inspection tray to generate a first association information.

As shown in FIG. 1 and FIG. 2, after distributing to the current baggage to be inspected the security inspection tray for holding the baggage to be inspected, the tray distributing and associating unit conveys the security inspection tray in which the baggage to be inspected is loaded to the security inspection imaging and sorting unit. The security inspection imaging and sorting unit performs radiation imaging of the baggage to be inspected and then obtains a security image of the inspected baggage. The security inspection imaging and sorting unit also reads the identifier of the security inspection tray. Then, the security inspection imaging and sorting unit sends the security image and the identifier of the security inspection tray in which the inspected baggage is loaded to the server, which processes the security image and the identifier of the security inspection tray to generate a second association information. Meanwhile, the security inspection imaging and sorting unit determines whether there is any suspect object in the inspected baggage according to the security image from the radiation imaging. The security inspection imaging and sorting unit may be an X-ray security inspection device or other security inspection devices for the baggage to be inspected (such as a trace explosive detector and the like) or a combination thereof. The X-ray security inspection device used in the security inspection imaging and sorting unit may be a dual-view security inspection machine, a single-view security inspection machine or a CT security inspection machine. Preferably, the X-ray security inspection device of the security inspection imaging and sorting unit is a dual-view security inspection machine. The security inspection imaging and sorting unit evaluates and sorts the inspected baggage according to the security image from the radiation imaging. If there is any suspect object, the inspected baggage will be further checked. Otherwise, if there is no suspect object, the inspected baggage will be conveyed to a designated area from which the inspected person can take his/her baggage away. At the security inspection imaging and sorting unit, the inspected luggage may be manually sorted or may be automatically sorted by a baggage sorting device (not shown). Specifically, the baggage sorting device may be provided at the exit of a security inspection channel of the X-ray security inspection device. When the X-ray security inspection device detects a piece of suspect baggage, a suspect baggage delivery device will be actuated to deliver the suspect baggage to a suspect baggage conveying device. When the X-ray security inspection device detects a piece of normal baggage, the suspect baggage delivery device will not be actuated and the normal baggage will be delivered to a normal baggage conveying device which will convey the normal baggage to a designated area from which the inspected person will take his/her baggage away.

As shown in FIG. 2, after receiving the obtained information of the person to be inspected and the identifier of the security inspection tray transmitted from the tray distributing and associating unit, the server processes the information of the person to be inspected and the identifier of the security inspection tray together and generates a first association information. After receiving the security image and the identifier of the security inspection tray in which the baggage to be inspected is loaded, transmitted from the security inspection imaging and sorting unit, the server processes the security image and the identifier of the security inspection tray in which the baggage to be inspected is loaded together and generates a second association information, wherein the security image is obtained by the security inspection imaging and sorting unit after checking the baggage to be inspected, and the identifier of the security inspection tray in which the baggage to be inspected is loaded is read by the security inspection imaging and sorting unit. The first and second association information comprise the same identifier of the security inspection tray. The server matches and stores the information of the person to be inspected with information of the security image according to the identifier of the security inspection tray in the first association information and the second association information. The information of the person to be inspected and the information of the security image may be searched and retrieved from the server later, if needed.

As shown in FIG. 1, the integrated security inspection passage of the present invention may further comprise a re-check unit in the baggage check area. The re-check unit is adapted to re-check the inspected baggage containing suspect objects after the baggage is sorted by the security inspection imaging and sorting unit. The re-check unit is used in combination with the security inspection imaging. Specifically, the security inspection imaging and sorting unit determines whether there is any suspect object in the inspected baggage according to the security image. If the security inspection imaging and sorting unit determines the inspected baggage contains suspect objects, the inspected baggage will be delivered to the re-check unit, which will re-check the inspected baggage. At the re-check unit, the re-checking of the checked baggage containing suspect objects may be a manual unpacking of the baggage to further determine whether there is actually any suspect object. After the manual unpacking, the inspected baggage may be further checked with an X-ray security inspection device, and after the X-ray inspection, conveyed to a designated area from which the inspected person can take his/her baggage away. Preferably, the X-ray security inspection device in the re-check unit is a single-view security inspection machine. After being determined as unsuspect by the re-check unit, the inspected baggage will be conveyed to a designated area from which the inspected person can take his/her baggage away.

As shown in FIG. 1, the integrated security inspection passage of the present invention may further comprise a human-body machine-check unit and a human-body manual-check unit in a body check area. The human-body machine-check unit is provided in front of the human-body manual-check unit. After passing the check by the human-body machine-check unit, the inspected person can directly walk out of the body check area or go to a baggage pick-up area to pick up his/her inspected baggage. After being detected as suspicious by the human-body machine-check unit (for example, the human-body machine-check unit raises the alarm), the inspected person will be checked at the human-body manual-check unit. The inspected person is further checked with a hand-held security inspection device. After passing the check by the human-body manual-check unit, the inspected person can directly walk out of the body check area or go to a baggage pick-up area to pick up his/her inspected baggage. Preferably, the human-body machine-check unit of the present invention is a human-body security inspection device (not shown) and/or a portal-type metal detection device (for example, a metal detection gate).

Automatic security portals may be provided in front of the human-body machine-check unit to further restrict and divide the flow of persons to be inspected. Only those persons to be inspected who have passed through the automatic security portals can enter the human-body machine-check to be subject to a manual human-body check.

According to one embodiment of the present invention, an empty tray identification and collection system is provided at the end of the baggage check area to further reduce labor cost. The empty tray identification and collection system and the security inspection imaging and sorting unit are connected by an automatic conveying system to transfer the inspected baggage and the security inspection trays. After the inspected person has taken away his/her inspected baggage, the security inspection tray will be conveyed to the empty tray identification and collection system. The empty tray identification and collection system identifies the security inspection trays, and then collects and conveys the empty security inspection trays to the tray distributing and associating unit for reuse. The empty tray identification and collection system according to the present invention makes it possible to regularly manage the security inspection trays and automatically sort the inspected baggage, thereby reducing the number of required security inspectors.

As stated above, the present invention provides an integrated security inspection channel. The integrated security inspection channel employs the automatic security portals to restrict and divide the flow of persons to be inspected. The security check for the persons to be inspected and the security check for their baggage are separately performed, such that the overall security inspection channel can keep organized. The integrated security inspection channel employs the automatic conveying system and the X-ray security inspection device to check and sort the baggage to be inspected. The integrated security inspection channel employs a comprehensive security information system to associate the information of the person to be inspected with the information of the baggage to be inspected so as to improve the integrity and traceability of the security inspection information. The integrated security inspection channel employs the empty the empty tray identification technique to automatically collect the empty security inspection trays. The present invention provides a highly automated and integrated modular design, which can reduce labor cost and improve the efficiency for security inspection and thus can be applied to various places with the need for security check, such as airports and customs.

While the invention has been described with reference to exemplary embodiments thereof, it is to be understood that the invention is not limited to the disclosed embodiments or constructions. It should be understood by those skilled in the art that various modifications, combinations, sub-combinations and alterations may occur within the spirit and scope of the invention insofar as they are within the scope of the appended claims or the equivalents thereof. The patentable scope of the invention is defined by the claims.

What is claimed is:

1. An integrated security inspection system, comprising:
   a server,
   an input device in an information input area,
   a tray distributing and binding unit comprising an automatic conveyor, and
   a security inspection imaging and sorting unit in a baggage check area, wherein the security inspection imaging and sorting unit comprises at least one of an X-ray security inspection device and a trace explosive detector;
   wherein the tray distributing and binding unit is provided in front of the security inspection imaging and sorting unit, and is adapted to distribute a security inspection tray with an identifier to a piece of baggage to be inspected;
   wherein the input device, the tray distributing and binding unit and the security inspection imaging and sorting unit are connected with the server, respectively; the input device is adapted to obtain information of a person to be inspected and send the information to the server; the tray distributing and binding unit is adapted to obtain information of the person to be inspected and the identifier of the security inspection tray and sending them to the server, which is adapted to bind the information of the person to be inspected and the identifier of the security inspection tray to generate a first binding information;
   wherein the security inspection imaging and sorting unit is adapted to check the baggage to be inspected to obtain a security image, read the identifier of the security inspection tray in which the baggage to be inspected is loaded, and send the security image and the identifier of the security inspection tray in which the baggage to be inspected is loaded to the server, which is adapted to bind the security image and the identifier to generate a second binding information; and
   wherein the server is adapted to match and store the information of the person to be inspected with information of the security image according to the first binding information and the second binding information.

2. The integrated security inspection system according to claim 1, wherein the X-ray security inspection device is any one of a dual-view security inspection machine, a single-view security inspection machine and a CT security inspection machine.

3. The integrated security inspection system according to claim 2, wherein the security inspection imaging and sorting unit also comprises a baggage sorting device;
   the baggage sorting device is provided at the exit of a security inspection channel of the X-ray security inspection device;
   when the X-ray security inspection device detects a piece of suspect baggage, a suspect baggage delivery device will be actuated to deliver the suspect baggage to a suspect baggage conveying device; and
   when the X-ray security inspection device detects a piece of normal checked baggage, the suspect baggage delivery device will not be actuated and the normal baggage will be delivered to a normal baggage conveying device.

4. The integrated security inspection system according to claim 3, further comprising:
   a re-check unit comprising an X-ray security inspection device in the baggage check area, wherein the re-check unit is provided after the security inspection imaging and sorting unit and is adapted to re-check the inspected baggage containing suspect objects after the inspected baggage is sorted by the security inspection imaging and sorting unit.

5. The integrated security inspection system according to claim 4, further comprising:
   a human-body machine-check unit and a human-body manual-check unit in a body check area; the human-body machine-check unit is provided in front of the human-body manual-check unit; wherein the system is arranged and configured such that, after being designated as suspicious by the human-body machine-check unit, the inspected person is checked at the human-body manual-check unit.

6. The integrated security inspection system according to claim 5, wherein the human-body machine-check unit comprises at least one of a human-body security inspection device and a portal-type metal detection device, and the human-body manual-check unit is a hand-held metal detection device.

7. The integrated security inspection system according to claim 6, wherein one or more automatic security portals are provided in front of the human-body machine-check unit, and are adapted to restrict the number of persons to be inspected that enter the body check area.

8. The integrated security inspection system according to claim 7, further comprising:
   an empty tray identification and collection system comprising an automatic conveyor in the baggage check area, wherein the empty tray identification and collection system and the security inspection imaging and sorting unit are connected by the automatic conveyor and transfer the inspected baggage and the security inspection trays through the automatic conveyor; and wherein the empty tray identification and collection system identifies the security inspection trays, and then collects and conveys the empty security inspection trays to the tray distributing and binding unit for reuse.

9. The integrated security inspection system according to claim 8, wherein the security inspection tray comprises an RFID identifier that is associated with the person and baggage to be analyzed via the server.

10. The integrated security inspection system according to claim 9, wherein the input device includes a device to scan a boarding pass of the person to obtain first information including personal identification information and/or flight information.

11. The integrated security inspection system according to claim 10, wherein automatic control of the integrated security inspection system is performed via the server as a function of one or both of the RFID identifier and the first information, including automatic distribution of the security inspection tray as a function of a user instruction.

12. The integrated security inspection system according to claim 1, wherein the security inspection imaging and sorting unit also comprises a baggage sorting device;

the baggage sorting device is provided at the exit of a security inspection channel of the X-ray security inspection device;

when the X-ray security inspection device detects a piece of suspect baggage, a suspect baggage delivery device will be actuated to deliver the suspect baggage to a suspect baggage conveying device; and when the X-ray security inspection device detects a piece of normal checked baggage, the suspect baggage delivery device will not be actuated and the normal baggage will be delivered to a normal baggage conveying device.

13. The integrated security inspection system according to claim 1 further comprising a re-check unit comprising an X-ray security inspection device in the baggage check area, wherein the re-check unit is provided after the security inspection imaging and sorting unit and is adapted to re-check the inspected baggage containing suspect objects after the inspected baggage is sorted by the security inspection imaging and sorting unit.

14. The integrated security inspection system according to claim 1, further comprising a human-body machine-check unit and a human-body manual-check unit in a body check area; the human-body machine-check unit is provided in front of the human-body manual-check unit; wherein the system is arranged and configured such that, after being designated as suspicious by the human-body machine-check unit, the inspected person is checked at the human-body manual-check unit.

15. The integrated security inspection system according to claim 14, wherein the human-body machine-check unit comprises at least one of a human-body security inspection device and a portal-type metal detection device, and the human-body manual-check unit is a hand-held metal detection device.

16. The integrated security inspection system according to claim 14, wherein one or more automatic security portals are provided in front of the human-body machine-check unit, and are adapted to restrict the number of persons to be inspected that enter the body check area.

17. The integrated security inspection system according to claim 1, further comprising an empty tray identification and collection system comprising an automatic conveyor in the baggage check area, wherein the empty tray identification and collection system and the security inspection imaging and sorting unit are connected by the automatic conveyor and transfer the inspected baggage and the security inspection trays through the automatic conveyor; and wherein the empty tray identification and collection system identifies the security inspection trays, and then collects and conveys the empty security inspection trays to the tray distributing and binding unit for reuse.

18. The integrated security inspection system according to claim 1, wherein the security inspection tray comprises an RFID identifier that is associated with the person and baggage to be analyzed via the server.

19. The integrated security inspection system according to claim 18, wherein the input device includes a device to scan a boarding pass of the person to obtain first information including personal identification information and/or flight information.

20. The integrated security inspection system according to claim 19, wherein automatic control of the integrated security inspection system is performed via the server as a function of one or both of the RFID identifier and the first information, including automatic distribution of the security inspection tray as a function of a user instruction.

* * * * *